United States Patent

Madden et al.

[11] Patent Number: 5,878,863
[45] Date of Patent: Mar. 9, 1999

[54] CONVEYING SYSTEM FOR FOODSTUFFS

[75] Inventors: Ian Robert Madden; Charles Edward Esson; Peter Gary Brown, all of Victoria, Australia

[73] Assignee: Colour Vision Systems Pty Ltd., Australia

[21] Appl. No.: 793,362

[22] PCT Filed: Aug. 23, 1995

[86] PCT No.: PCT/AU95/00523

§ 371 Date: Apr. 1, 1997

§ 102(e) Date: Apr. 1, 1997

[87] PCT Pub. No.: WO96/06031

PCT Pub. Date: Feb. 29, 1996

[30] Foreign Application Priority Data

Aug. 24, 1994 [AU] Australia ............................... PM 7620

[51] Int. Cl.[6] .................................................. B65G 47/46
[52] U.S. Cl. ...................... 198/370.04; 209/539; 209/912
[58] Field of Search ..................... 198/384, 387, 198/370.03, 370.04, 370.09, 371.3; 209/912, 939, 646, 648, 698; 177/52

[56] References Cited

U.S. PATENT DOCUMENTS

| 4,957,619 | 9/1990 | Powell, Jr. .............................. 209/539 |
| 4,961,489 | 10/1990 | Warkentin ............................ 209/539 X |
| 5,044,504 | 9/1991 | Powell, Jr. ............................... 209/539 |
| 5,101,982 | 4/1992 | Gentili .................................... 209/556 |
| 5,294,004 | 3/1994 | Leverett ......................... 198/370.04 X |
| 5,474,167 | 12/1995 | Waskentin ...................... 198/370.09 X |
| 5,477,955 | 12/1995 | Madden et al. ..................... 198/370.04 |
| 5,626,238 | 5/1997 | Blanc .................................. 209/912 X |
| 5,677,516 | 10/1997 | Leverett et al. .......................... 177/52 |

FOREIGN PATENT DOCUMENTS

| 24410/88 | 5/1989 | Australia . |
| 1058876 | 2/1967 | United Kingdom . |
| 89/12596 | 12/1989 | WIPO . |
| 90/09944 | 9/1990 | WIPO . |

*Primary Examiner*—James R. Bidwell
*Attorney, Agent, or Firm*—Larson & Taylor

[57] ABSTRACT

A conveying system (10) for foodstuffs comprising a first conveyor (11) and a second conveyor (12) placed side by side with the end of the first conveyor overlapping the start of the second conveyor. The overlapping portions of the conveyors are in close proximity so as to define a transfer zone (25). Each conveyor has a plurality of foodstuff supports each adapted to support a single piece of foodstuff, and a tilting device to tilt the foodstuff support of the first conveyor to cause the foodstuff to roll from the support of the first conveyor to the support of the second conveyor. The first conveyor (11) includes a photographic zone and the second conveyor includes a weighing zone and multiple ejection zones.

21 Claims, 9 Drawing Sheets

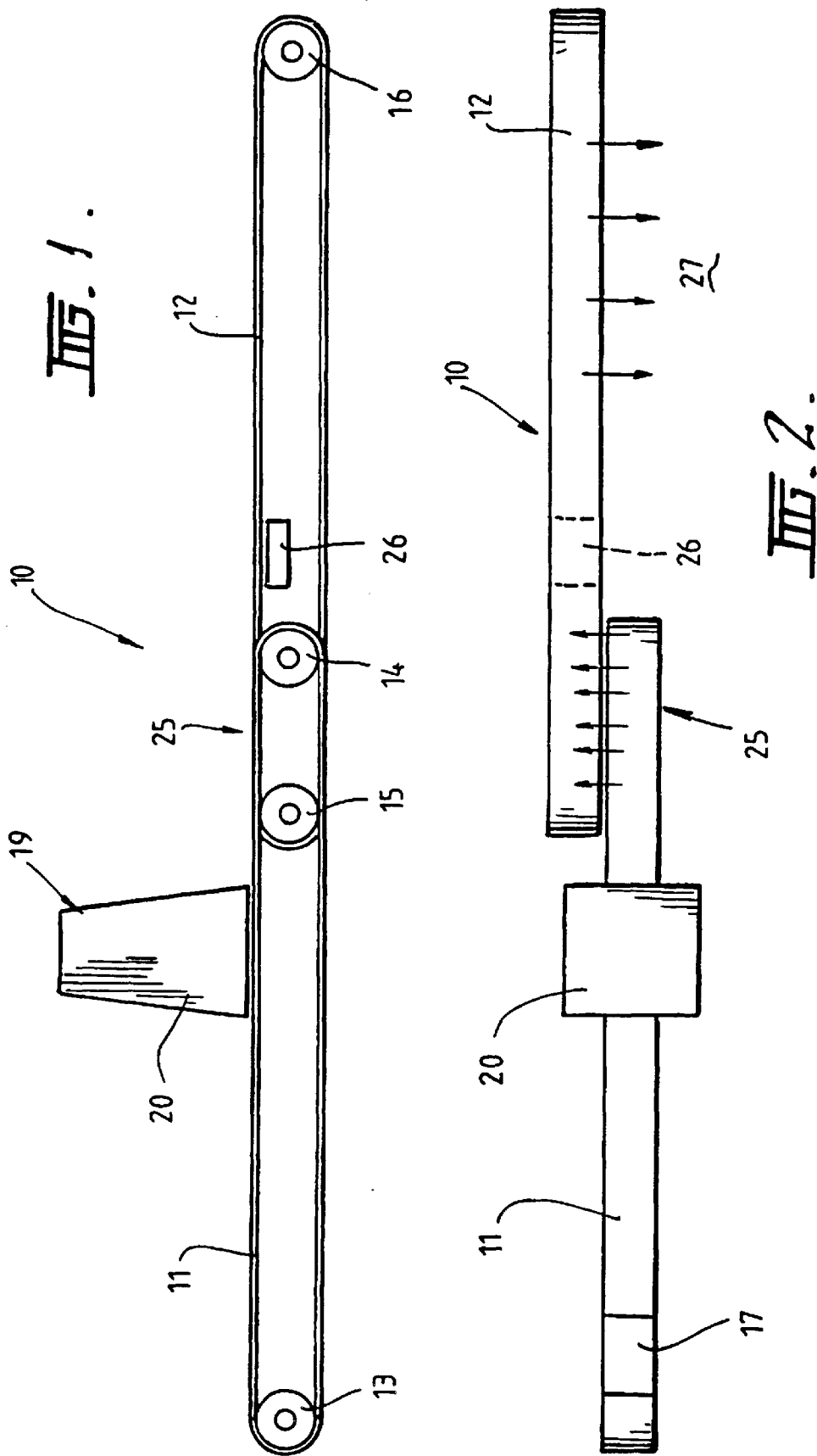

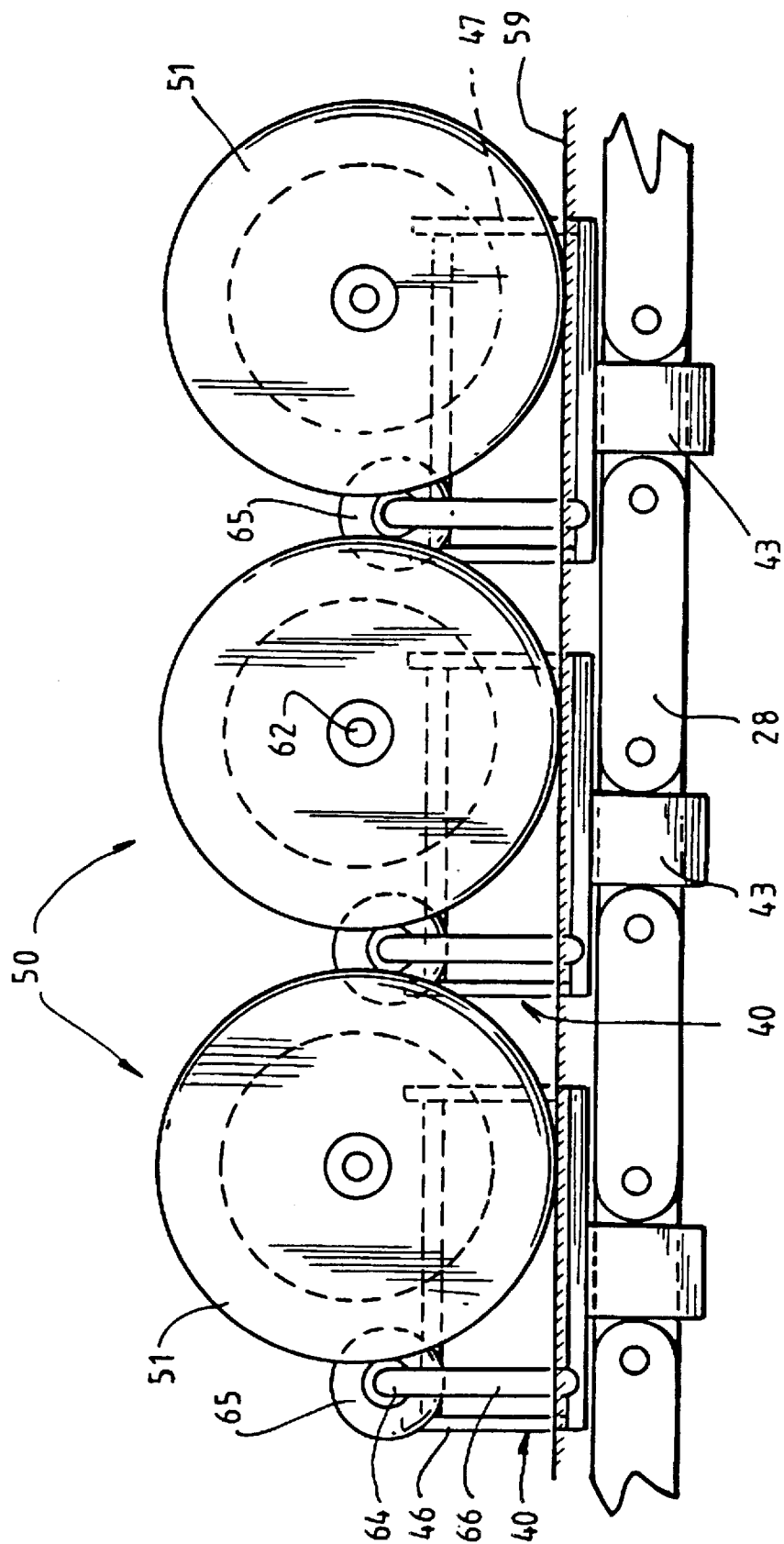

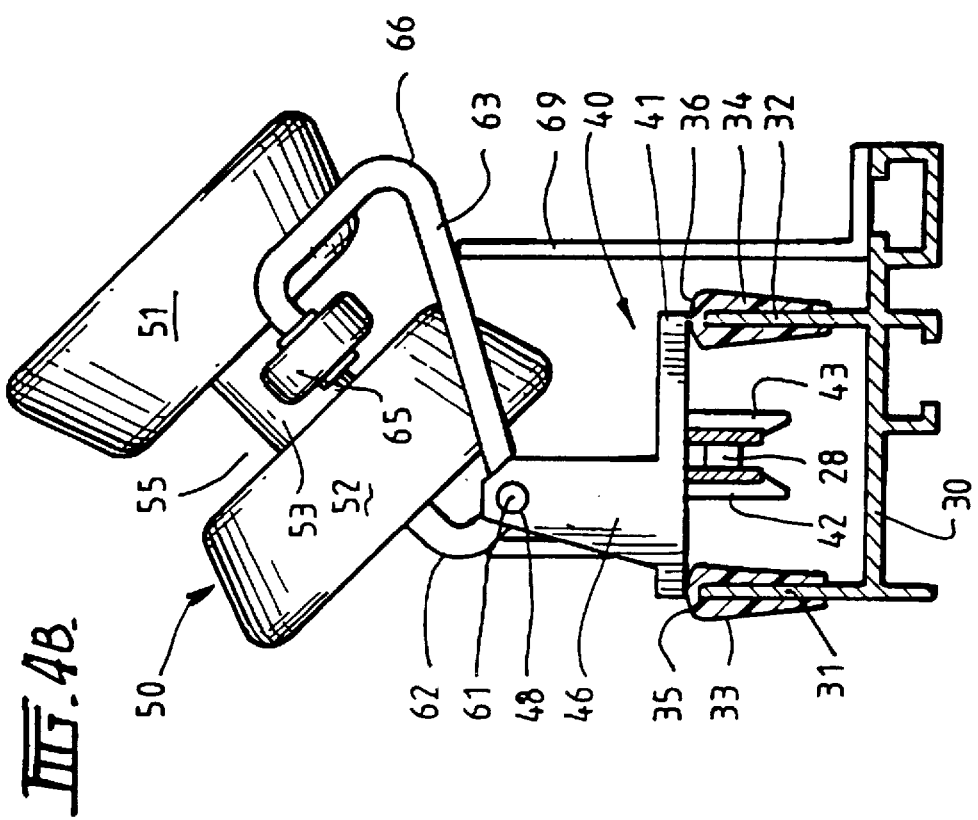
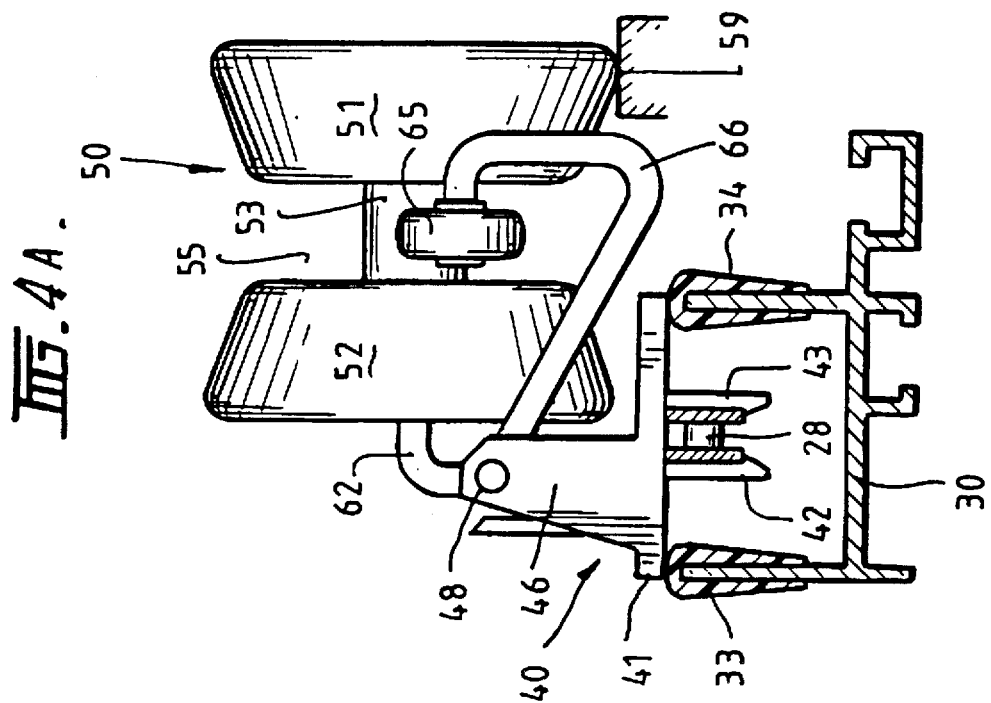

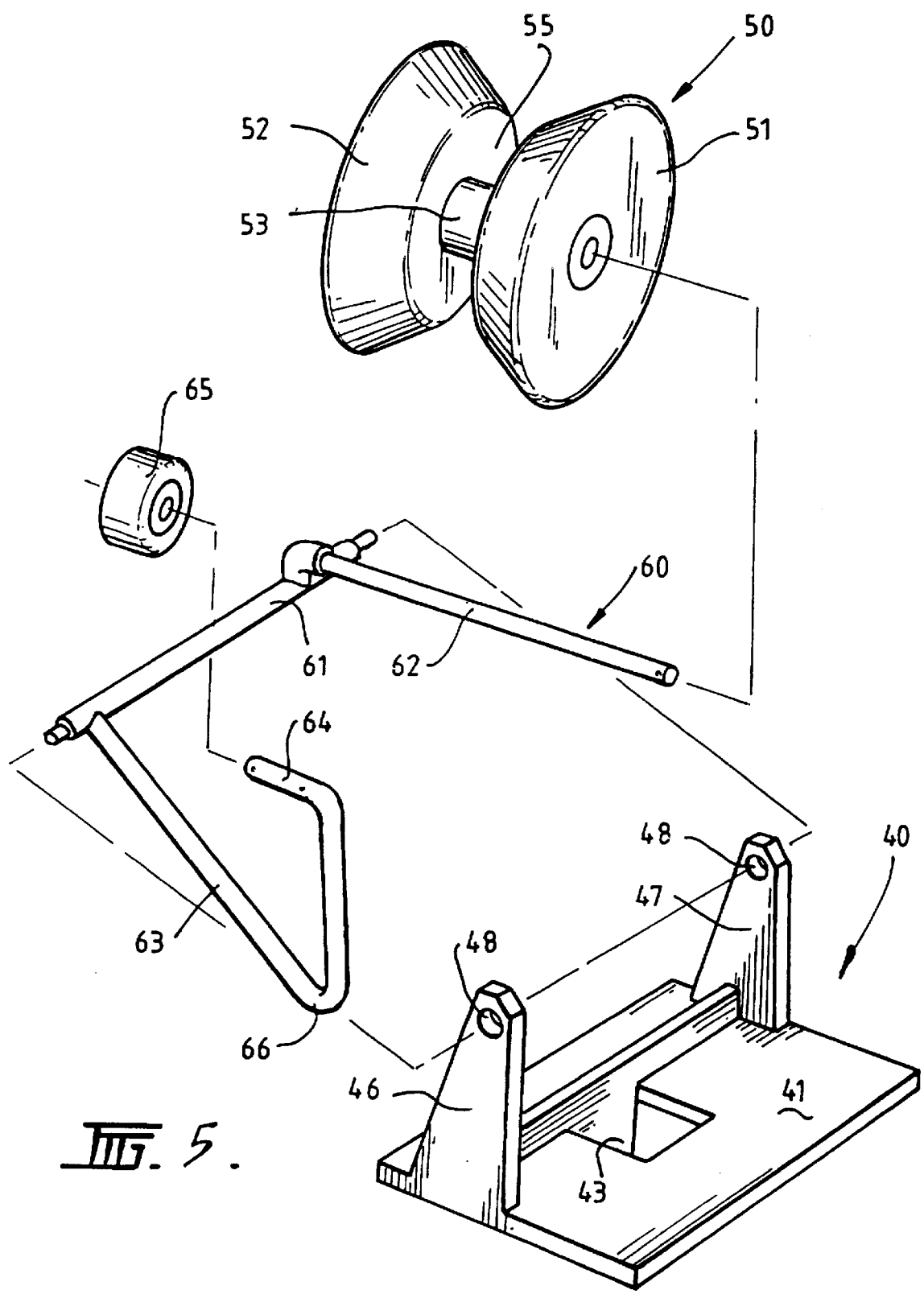

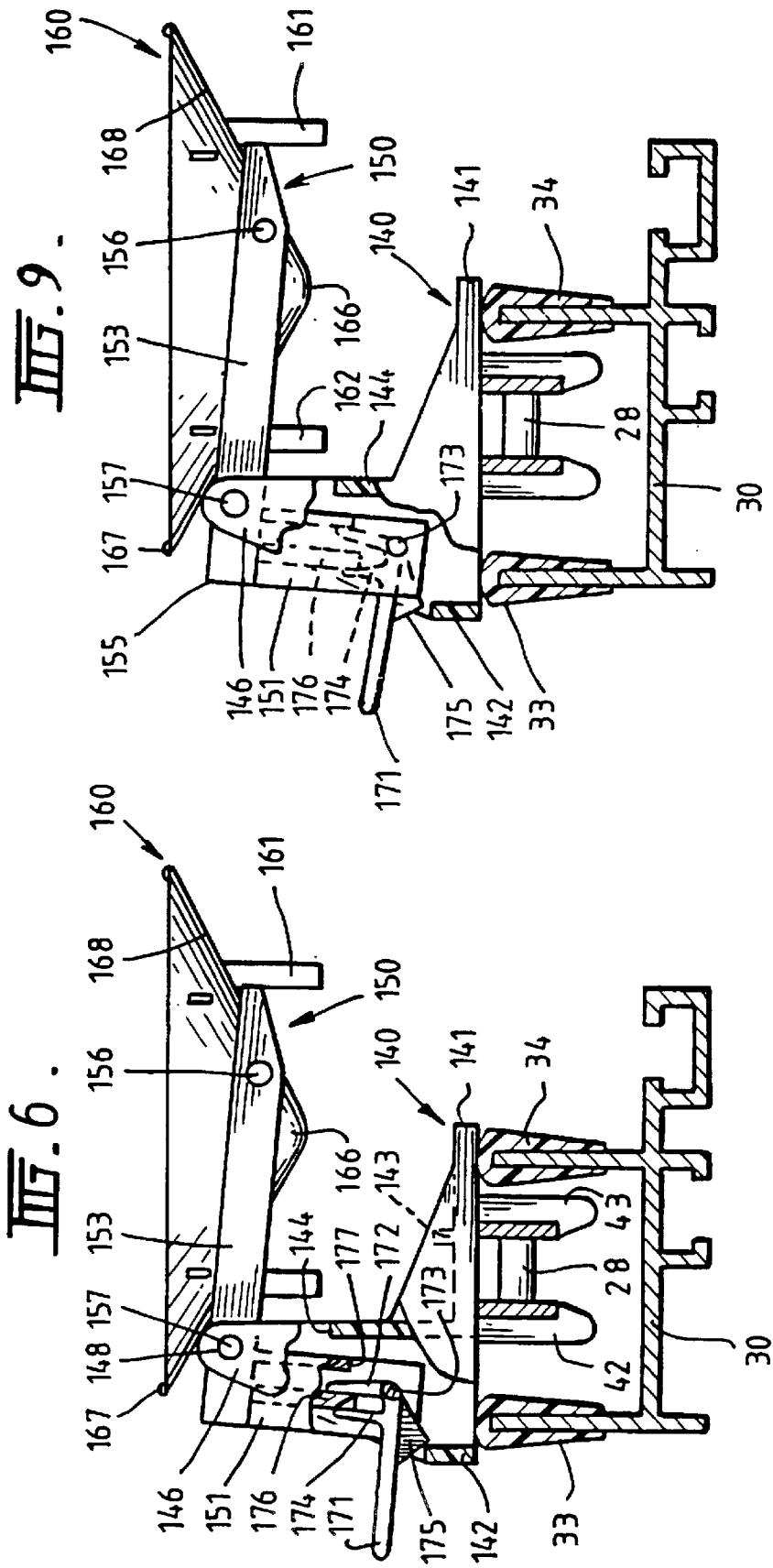

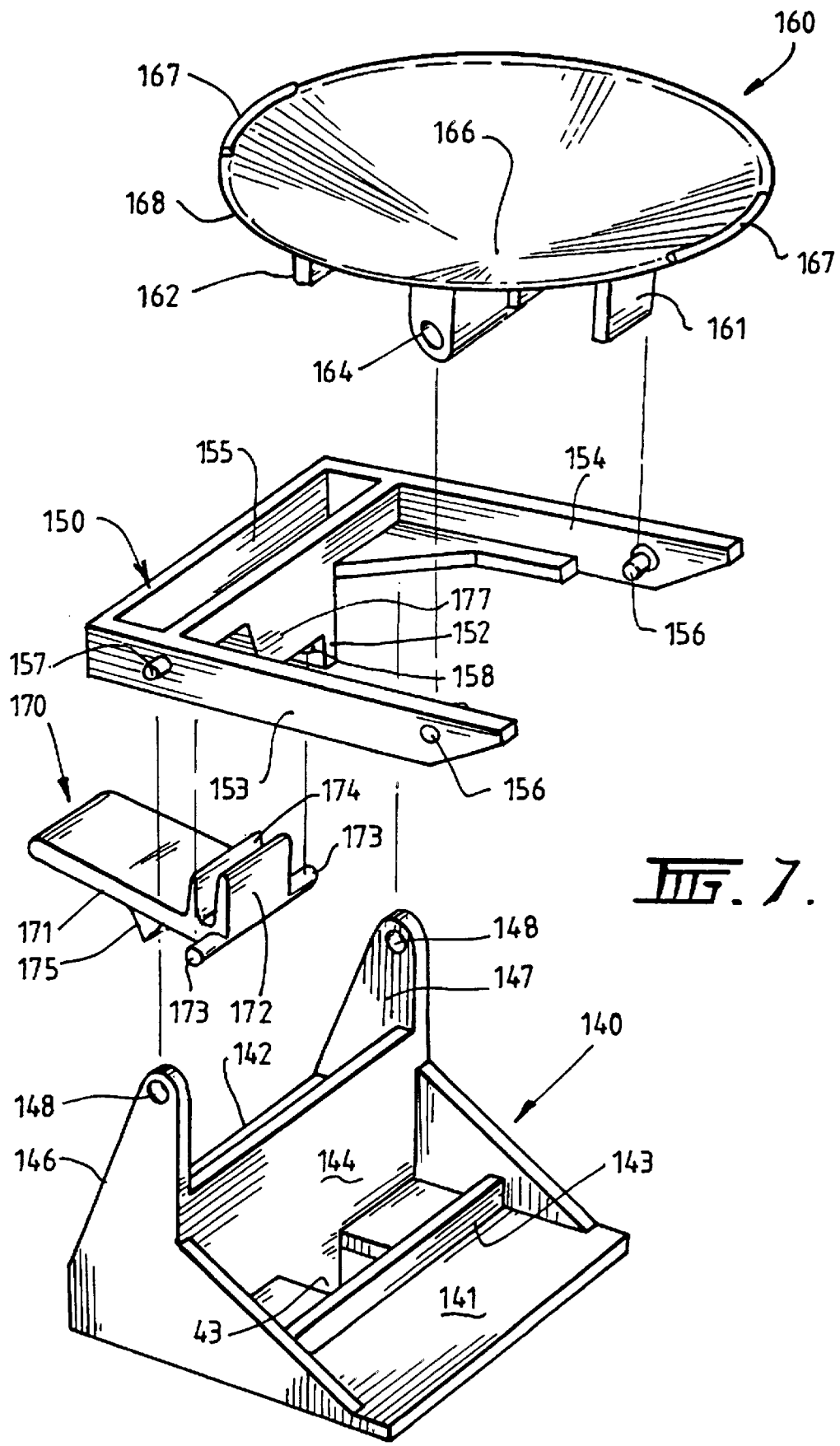

CONVEYING SYSTEM FOR FOODSTUFFS

FIELD of the Invention

This invention relates to a conveying system and in particular to components of a conveyor for use to sort, size or weigh a variety of fruit or vegetables. This invention also relates to the method and apparatus disclosed in earlier patent applications of the applicant. See PCT/AU90/00464 and PCT/AU92/00551.

DESCRIPTION OF THE PRIOR ART

In the applicant's earlier applications PCT/AU90/00464 and PCT/AU92/00551, there is disclosed a conveying system that in essence sorts fruit or vegetables by using a camera that views the fruit or vegetables as they rotate slowly past the camera zone. The camera feeds a signal to a computer that notes the size, shape, colour and weight of each fruit and its location on the conveyor line. The computer then activates solenoids that effect a discharge mechanism that causes the fruit or vegetables to be tipped off the conveying system for collection into suitable bins. In this manner, the system can automatically sort fruit and vegetables at high speed into discrete groups based on size, colour, weight and defects.

The componentary that makes up a conveying systems of the kind described above is inherently complex. Designers strive to produce simply moulded plastics components that effectively do the job but do not require hugh expenditure in tooling costs. It is also important with conveying systems of the kind described above that they are reliable and that if there is a jam or break down there is no mass destruction of the componentary.

It has been discovered that an important criterion for efficient use of a camera to view fruit or vegetables is the quality of surrounding light. It is difficult to illuminate fruit or vegetables from the underside of the conveyor due to the complexity of the conveyor componentary. The more complicated the conveyor componentary the more difficult and expensive are the tooling costs. A further problem with conveying systems of the kind described above is the design of a mechanism that allows the fruit to be weighted. It is known to place a load sensor under a carriage carrying a single piece of fruit or vegetable. It is however difficult to ensure that the load sensor actually reads the whole mass of the fruit and its carriage. A further problem with load sensors of this kind is that, due to the speed of the conveying system and the vibrations that are inherent in any such systems there is a danger that there will be wild fluctuations in the load that is actually sensed by the load sensor plate.

It is these problems that have brought about the present invention.

SUMMARY OF THE INVENTION

In accordance with the present invention there is provided a conveying system for foodstuffs comprising a first conveyor and a second conveyor placed side by side with the end of the first conveyor overlapping the start of the second conveyor, the overlapping portions of the conveyors being in close proximity to define a transfer zone, each conveyor having a plurality of foodstuff support means adapted each to support a single piece of foodstuff, and means to tilt the foodstuff support means of the first conveyor to cause the foodstuff to roll from the support means of the first conveyor to the support means of the second conveyor.

Preferably, the foodstuff support means is designed to facilitate simple ejection of foodstuff whilst at the same time adaptable to ensure accurate and positive readings by a load cell sensor plate.

Preferably, each foodstuff support means of the second conveyor comprises a support member attached to the chain, the support member pivotally supporting a pair of parallel spaced apart radius arms which in turn pivotally support a cup adapted to support a foodstuff, the radius arms being joined by a latch assembly that engages the support member to control the pivotal relationship between the radius arms and the support member.

According to the present invention there is further provided a weighing cup for use in a foodstuff conveying and sorting system, the weighing cup comprising a cup adapted to support foodstuff, the cup being pivotally secured across a pair of radius arms to pivot about a single pivot axis, the radius arms being pivotally coupled to support means arranged to be secured to a conveyor to cause the cups to be displaced along a longitudinal conveying path, the conveying path being substantially parallel to the pivot axes of the cup and radius arms, the cup having at least one downwardly projecting leg whereby in use, as the cup moves through a weighing station, the leg rides up a ramp to cause the cup to be lifted relative to the support means and to be borne by a weight sensor plate as the leg slides along the length of the sensor plate so that the plate can sense the weight of the cup and its content

DESCRIPTION OF THE DRAWINGS

Embodiments of the present invention will now be described, by way of example only, with reference to the accompanying drawings in which:

FIG. 1 is a schematic side on view of a conveyor system;

FIG. 2 is a schematic plan view of the conveyor system;

FIG. 3 is a side elevational view of part of a first conveyor;

FIG. 4A is an end elevational view of part of the first conveyor in a fruit transporting position;

FIG. 4B is an end on view of the first conveyor when in a transfer position;

FIG. 5 is an exploded view of a fruit support system for the first conveyor;

FIG. 6 is a side elevational view of part of the fruit support system of a second conveyor;

FIG. 7 is an exploded perspective view of the components that make up the fruit support system of the second conveyor;

FIG. 9 is a side elevational view of the fruit support system of the second conveyor when in a released for ejection position;

DESCRIPTION OF THE EMBODIMENTS

Figure 8:
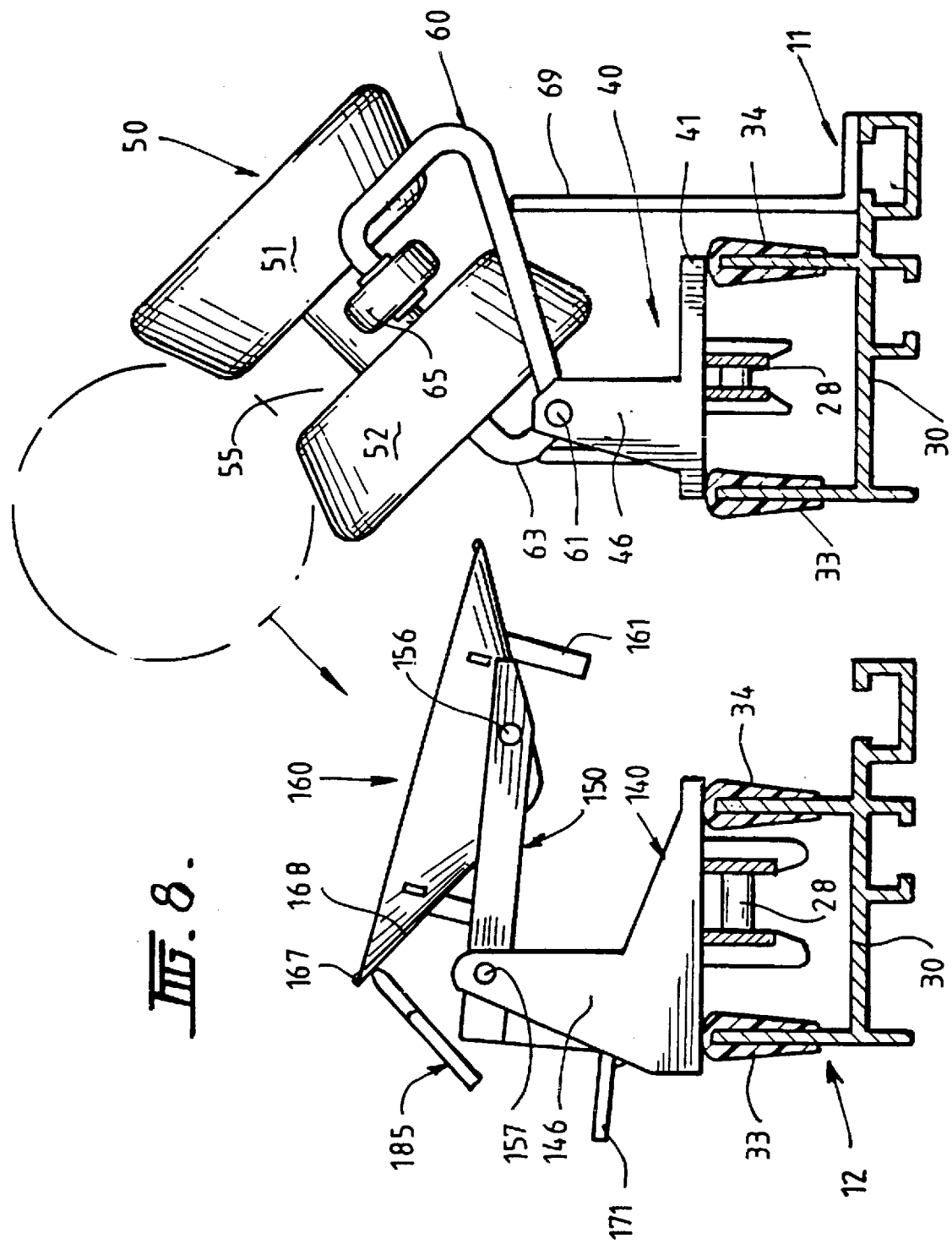
FIG. 8 is a side elevational view showing the transfer between the first conveyor to the second conveyor.

The conveying system 10 used to size, sort and, in some cases, weigh fruit and vegetables is shown schematically in FIGS. 1 and 2. The system comprises two endless conveyors 11 and 12 of which are driven between spaced apart drive sprockets 13, 14, 15 and 16. The first conveyor includes a singulator 17 that causes fruit to form a single line. A photographic zone 19 which is in the form of a camera box 20 that is positioned above the path of the conveyor. The camera box contains a CCD camera which is in turn coupled to a computer not shown. The design and operation of the CCD camera and its association with the computer is described in more detail in the applicant's patent application PCT/AU90/00464. The disclosure of this application is incorporated herein by reference. The fruit leave the photographic zone 19 to pass into a transfer zone 25 positioned at one end of the first conveyor 11. The transfer zone 25 is designed to allow the fruit to be transferred laterally onto the second conveyor 12, the entry of which runs parallel to and adjacent to the end zone of the first conveyor as shown in FIG. 2. The second conveyor 12 incorporates a load cell 26 that allows each piece of fruit to be weighed and a plurality of collection zones 27. In simple terms, as the fruit passes through the photographic zone 19, the camera notes the size, shape and colour and the location of the fruit. The computer allocates each piece of fruit to a collection zone and triggers an ejection means to tip the fruit off the second conveyor 12 at predetermined positions into collection bins. This tipping mechanism is also subject to information received from the load cell so that the various collection bins collect the fruit in categories of size, shape, weight and colour.

Although in the described embodiment the fruit is formed into a single line for exposure to the camera and then that single line is transferred onto the second conveyor means, it is understood that a pair of second conveyor means may be provided on either side of the first conveyor means which could include two lines of fruit whereby the lines are transferred respectively to either side onto the second conveyors.

The first conveyor comprises an endless chain 28 driven between the drive sprockets 13 and 14. As shown in FIGS. 3 and 4, the first conveyor is supported on an aluminium extrusion 30 that has parallel upstanding wall portions 31 and 32 that support extruded plastics cover members 33 and 34. The cover members define elongate bearing surfaces 35 and 36 on which the underside of a plurality of chain clips 40 can run. Each chain clip supports a fruit roller assembly 50 that is mounted to be rotatable on a roller support linkage 60 which is pivotally supported to the chain clip 40. Each chain clip 40 is injected moulded in plastics and as shown in FIG. 5 comprises a planar running surface 41 with a pair of downwardly extending clip portions 42 and 43. As shown in FIG. 4 the clip portions 42 and 43 engage a chain link 28. The upper surface of the chain clip 40 is provided with a pair of upwardly extending webs 46 and 47 of triangular configuration, the upper ends of the webs are provided with co-axial holes 48 which support part of the roller support bar 60 that in turns support the fruit roller assembly 50. The roller support bar 60 as illustrated in FIG. 5 and comprises three pieces of bent steel rod welded together. The first piece comprises an axle 61 that extends between the upstanding webs 46, 47 to be located in the holes 48. A roller support shaft 62 is attached adjacent one end of the axle 61 to extend perpendicular to the axle at a position disposed above the axis of the axle 61. The roller support shaft 62 supports in a freely rotatable manner the fruit roller assembly 50. The other end of the axle 61 has a triangular shaped bracket 63 welded thereto, the free end 64 of which supports an idler roller 65 and the apex 66 of which defines a abutment surface. It is understood that the roller support bar 60 could be replaced by a plastics moulding which would include the axle 61, roller support shaft 62, and an idler roller 65 support bracket having an abutment surface or apex 66.

The fruit roller assembly 50 comprises a pair of frusto conical support members 51, 52 made of flexible plastics or rubber mounted spaced apart on the shaft 62 via a cylindrical spacing member 53 to define a tapered support surface with a slot 55 extending therebetween. The frusto conical support members 51, 52 are mounted so as to be freely rotatable on the support shaft 62. The chain clips 40 and the fruit roller assemblies 50 are spaced on the chain at the pitch shown in FIG. 3 and it should be noticed that the idler rollers 65 are midway between the gaps between adjacent fruit roller assemblies 50 to effectively prevent small fruit falling between the rollers.

In the normal fruit supporting configuration, the fruit support rollers 50 adopt the configuration shown in FIGS. 3 and 4A, namely with the axis of the supporting shafts 62 extending horizontally and a single piece of fruit supported between adjacent rollers with the idler roller 65 preventing the fruit dropping through the gap between the rollers. The extreme edge of the outer frusto conical fruit support roller 51 is arranged to engage a friction surface 59 so that as the chain 28 moves and the rollers 51 pass the friction surface 59 the rollers are caused to rotate on the support shafts 62. The rotation of the rollers is to ensure that the fruit rotate slowly as they pass through the photographic zone 19 to ensure that the camera has a view of the whole periphery of the fruit.

Once the fruit has passed through the photographic zone 19, they reach the transfer zone 25 towards the end of the first conveyor 11. The transfer zone 25 is about a meter in length and defines as shown in FIG. 2 an area where the first conveyor 11 runs parallel and close to the second conveyor 12. The conveyors are driven at the same speed to thus be in synchronization with one another. As the first roller assemblies 50 reach the start of the transfer zone, the apex 66 on the underside of the roller support bar 60 engages the base of an inclined ramp 69 and is driven up the ramp 69 from the position shown in FIG. 4A to the position shown in FIG. 4B. The movement of the support bar 60 up the ramp 69 causes the roller support bar 60 to pivot about the triangular webs 46, 47 of the chain clip 40 to tilt the roller assemblies 50 to the position shown in FIG. 4B at which the fruit are tipped sideways to move from the first conveyor 11 to the second conveyor 12 as shown in FIG. 8.

The second conveyor 12 comprises a similar sprocket driven chain assembly as the first conveyor which is illustrated with similar reference numerals and is not described in detail herein. As shown in FIGS. 6 and 7, the chain clip 140 is similar to the chain clip 40 of the first conveyor 11 and is again moulded as a single component in plastics. However, the upper surface 141 of the chain clip 140 differs in the sense that there is an upstanding wall 144 extending between the triangular webs 146, 147 and on either side of the wall are a pair of smaller upstanding flanges 142 and 143 that extend across the clip 140 between the webs 146, 147. The webs 146, 147 of the chain clip 140 pivotally support a cup carriage 150 which in turn pivotally supports a fruit carrying cup 160. The underside of the carriage 150 is arranged to be latched against the rearward upstanding flange 142 on the chain clip 140 and is releaseable from that position by operation of a trigger 170 which is pivotally secured between two downwardly projecting webs 151, 152 on the underside of the cup carriage 150. The cup 160, carriage 150, trigger 170 and chain clip 140 are all moulded from plastics and form a four component assembly which constitutes the conveying surface driven by the chain 28 and includes a simple release mechanism that allows ejection of fruit held in the conveyor cup 160.

As shown in FIG. 7 the cup carriage 150 comprises a pair of radius arms 153, 154 extending parallel to one another and joined by an end portion 155. The free ends of the radius arms 153, 154 terminate in inwardly projecting spindles 156 that support downwardly extending flanges 164 on the underside 166 of the cup 160 so that the cup is pivotable about the spindles 156. The other ends of the radius arms 153, 154 are provided with outwardly extending stub axles 157 that locate in the holes 148 in the upper ends of the webs 146, 147 on the chain clip 140. In this manner, the cup carriage 150 can pivot relative to the chain clip 140. The pivot axes of the cup 160 and cup carriage 150 are parallel and substantially horizontal.

Each cup 160 as shown in FIG. 7 comprises a dished upper surface 165. The underside 166 has a pair of aligned downwardly extending legs 161 and 162 at the mid span of the cup when viewed longitudinally of the conveyor. The downwardly extending flanges 164 are offset from the centre line of the cup 160 so that the pivot axis is offset causing the rear end 168 of the cup to rest against the cup carriage 150. The forward end 167 of the cup 160 has a downward flange 169 that abuts the upper surface of the radius arms 153, 154 to limit forward pivotal movement of the cup 160 relative to the cup carriage 150 to the position shown in FIG. 8.

Figure 10:
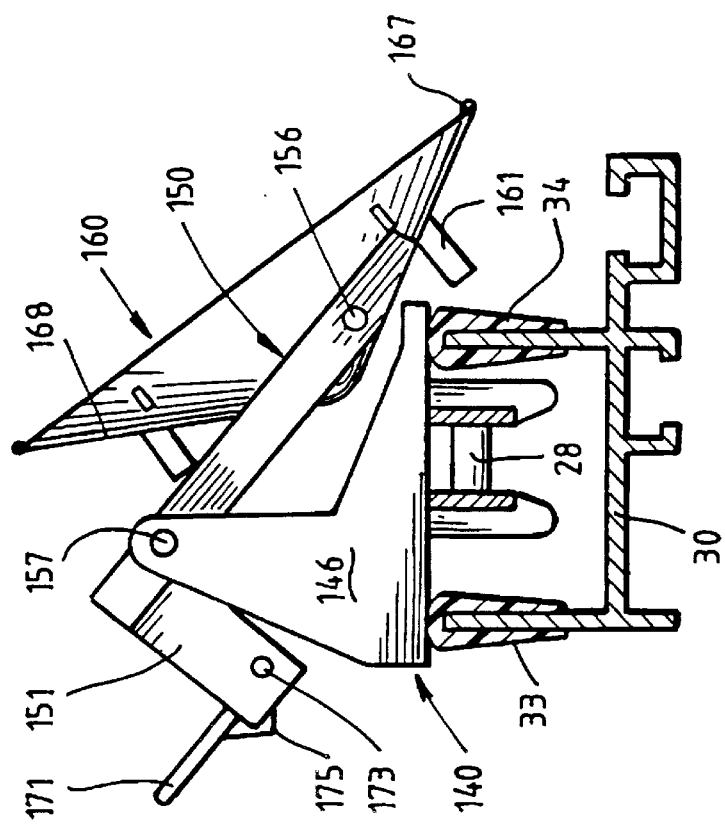
FIG. 10 is a side elevational view of the fruit conveyor system of the said conveyor in an ejection position.

The arrangement of the carriage 150 when it supports the cup 160 is such that the centre of gravity of the cup 160 and carriage 150 is displaced from the pivot axis causing the cup and carriage to naturally drop downwardly as shown in FIG. 10. The underside of the cup carriage includes a downwardly extending pair of location webs 151, 152 with coaxial apertures 158 and the trigger 170, shown in FIG. 7, clips into the apertures 158 between the webs 151, 152 to be pivotable therebetween. The webs 151, 152 also include a pair of gussets 176, 177 that extend in a parallel spaced apart manner as shown in dotted profile in FIGS. 6 and 9. The trigger 170 is L-shaped in the form of a rectangular plate 171 with an upstanding foot 172. At the join between the plate 171 and the foot 172 a pair of spindles 173 extend outwardly to facilitate pivotal location between the webs 151, 152 on the underside of the cup carriage 150. A small upstanding resilient finger 174 extends upwardly parallel to the foot 172 of the trigger 170. As shown in FIGS. 6 and 7 the foot 172 of the trigger 170 rests between the downwardly extending gussets 176, 177 thereby limiting movement of the trigger 170 to a small angle as the foot 172 engages either adjacent surface of the gussets 176, 177. The finger 174 rests against the outer surface of the larger gusset 176 and acts as a spring to force the trigger 170 into the position shown in FIG. 6. The underside of the trigger 170 has a triangular lug 175 that extends downwardly to engage against the interior of the upstanding flange 142 on the end of the chain clip 140. With the assembly shown in FIG. 6, the trigger 170 acts to prevent pivotal movement of the cup carriage 150 relative to the chain clip 140 due to the engagement of the triangular lug 175 on the flange 142 on the chain clip 140. To release the cup carriage 150, a solenoid (not shown) engages the free end of the rectangular plate 171 of the trigger 170 and pushes the trigger 170 upwardly against the resilient finger 174. The upward movement of the trigger 170 causes the triangular lug 175 to ride clear of the flange 142 on the chain clip 140 thereby releasing the trigger 170 (FIG. 9) so that the cup and carriage assembly pivots downwardly to the position shown in FIG. 10. As shown in FIG. 10 the downward pivotal movement of the carriage 150 also causes the cup 160 to pivot forwardly relative to the carriage and causes the fruit to tip out of the assembly into suitable collection bins or take off conveyors not shown. The solenoids are programmed by the computer to release the triggers 170 at determined times and positions along the route of the second conveyor 12. The cups 160 are returned to their horizontal, fruit supporting position, by a ramping mechanism (not shown) at the end of the conveyor which pushes each cup back up so that the trigger 170 re-engages against the flange 142 on the chain clip 140.

In a preferred embodiment the second conveyor 12 includes a load cell 26 which is coupled to the computer to accurately weigh each piece of fruit as it passes along the second conveyor. The load cell 26 and its association with the fruit carrying cup assembly is illustrated in FIGS. 11 and 12.

Figure 11:
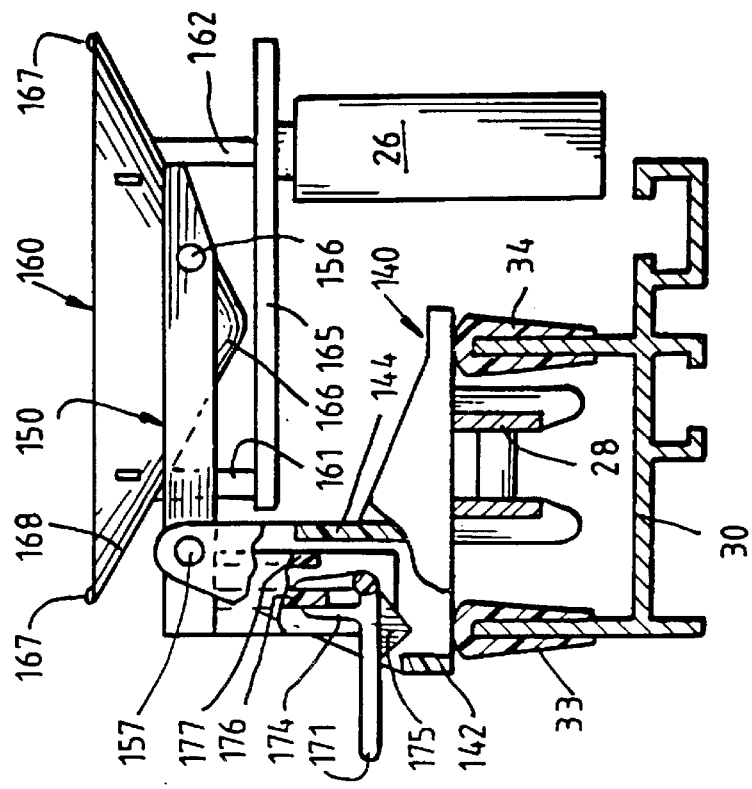
FIG. 11 is a side elevational view of the fruit support system of the second conveyor when travelling over a load cell.
Figure 12:
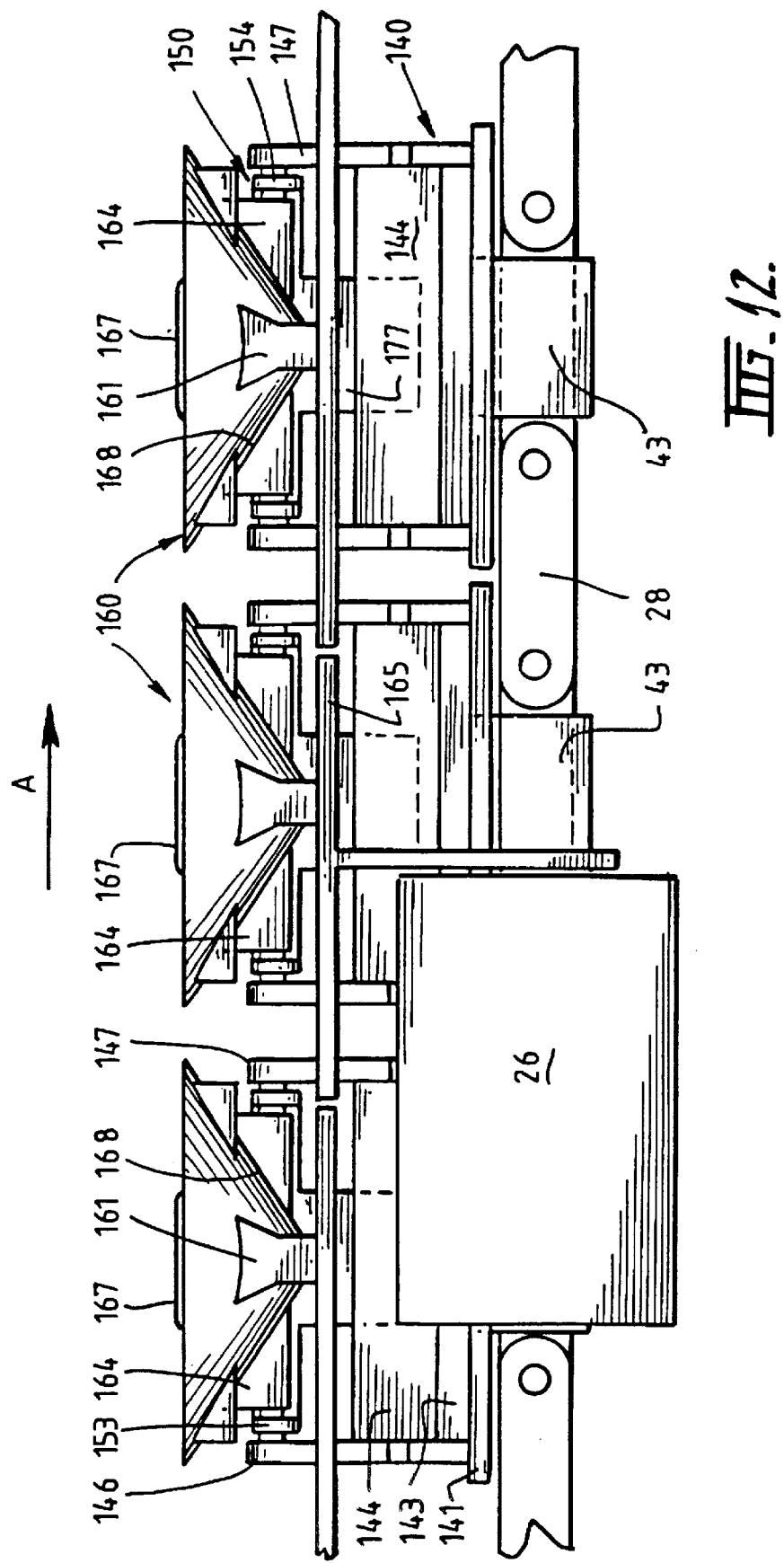
FIG. 12 is a side elevational view of the second fruit conveyor when over the load cell.

As shown in FIG. 11 the cup 160 has a pair of centrally positioned laterally spaced apart downwardly projecting legs 161, 162 and these legs are arranged to ride on to a load cell sensor plate 165 at the weighing zone of the conveyor. As shown in FIG. 11, one leg 161 is positioned adjacent the rear of the cup 160 and the other leg 162 is adjacent the front of the cup. Both legs 161 and 162 are positioned aligned about the mid-span of the cup so that the contact of the cup 160 on the load cell sensor plate is comparatively narrow, see FIG. 12. This means that as the cup 160 moves in the direction as shown in the arrow A in FIG. 12, it is in contact with the load cell sensor plate 165 for the period that it slides along the whole surface of the load cell sensor plate 165. The length of the sensor plate 165 is the same as the pitch of the carriages 150 so that as the legs 161, 162 of one cup 160 reach the start of the plate 165 the legs of the adjacent cup move off the other end of the plate.

The fact that the cup slides along the surface of the load cell sensor plate 165 for a considerable period produces a much more accurate reading. The fact that the conveyor is moving at considerable speed and the variations that are inherent in conveying systems of this kind means that the reading of the load cell fluctuates as the cup slides across the sensor plate. The longer the cup is on the sensor plate the better is the chance of producing a mean reading which accurately reflects the weight of the cup and fruit.

At the weighing zone, the legs 161, 162 of the cup 160 are ramped onto the load cell sensor plate 165. The upward ramp has the effect of causing the cup 160 to lift through its pivotal linkage with the carriage. As the legs 161, 162 rest on the sensor plate 165 the cup and fruit would be unstable due to the narrow width of the legs (see FIG. 12). However, the pivotal relationship of the cup 160 with the radius arms 153, 154 and the pivotal relationship of the cup carriage 150 with the chain clip 140 ensures that the cup lifts to be horizontal on the load plate 165 whilst at the same time being disassociated with any vertical component of the horizontal driving force of the chain conveyor. In this manner, the load cell through the legs 161, 162 of the cup 160 absorbs all the weight of the fruit and, the cup 160. The only other vertical force is through pivot points 156 and 157 and these frictional forces are so small as not to effect the recorded weight. The disconnection by the lifting action of all other physical association between the cup 160, carriage 150, chain clip 140 and trigger 170 ensures that the vertical component of the mass of the fruit and cup are not associated with the carriage's association with the chain clip 140.

The use of a pair of aligned legs 161 and 162 and support by radius arms 153, 154 also allows the cup 160 to be lifted through varying heights to thus accommodate physical irregularities in the conveyor and load plate 156 without detrimentally affecting the load readings.

As mentioned earlier in the specification, the computer is programmed to consider the size, shape and colour of the fruit together with the weight of each fruit. This information is then used for the computer to activate the solenoids that are positioned along the end of the second conveyor so that activation of the particular solenoids has the effect of causing the fruit to be ejected into collection bins which would collect fruit in accordance with size, shape, colour and weight. In this way, the system is able to sort and classify a variety of foodstuffs and in particular a variety of fruit and vegetables of greatly different shapes and sizes. Such foodstuffs include citrus and stone fruits, apples and tomatoes.

One of the main advantages of having a twin conveying system is that the weighing and ejection componentary can be included within the second conveyor leaving the fruit rotating and photographic zone to the first conveyor. The most critical parameter in the photographic zone is good light and it has been discovered that the use of a single conveyor system that incorporates fruit rotating means, a load cell sensor system as well as fruit ejection means that the conveyor is very cluttered in componentary rendering it extremely difficult to get adequate lighting to the fruit thereby reducing the quality of the image taken by the camera. By designing the first conveyor so that its only role is to rotate the fruit through the photographic zone and then transfer the fruit onto the second conveyor, the componentary is much simpler and less cluttered which facilitates the use of suitable lighting to adequately illuminate the fruit. The transfer zone allows simple and effective transfer of fruit from the first conveyor to the second conveyor by tilting the rollers of the first conveyor causing the fruit to be displaced sideways to roll onto the cup conveyors 160 which are also tilted slightly into the direction of the fruit entry as illustrated in FIG. 8. The slight tilting of the cup 160 is effected by causing an abutment 185 positioned adjacent the cup 160 at the transfer zone to engage the upper outer edge of the cup 160 to cause the cup to pivot forwardly of the carriage 150 to the position shown in FIG. 8. It is however understood that tilting of the cup conveyors 160 is not essential. Another option is to place brushes adjacent the outer edge of the cup conveyors so that fruit cannot roll off the conveyors as they fall from the rollers of the first conveyor.

Transfer of fruit at the transfer zone is carefully controlled to ensure that the right fruit is transferred to the right cup conveyor on the second conveyor. Since the colour, size and blemish information is gleaned whilst on the first conveyor it is important that the computer knows where a particular fruit is on the second conveyor so that it can be appropriately ejected. Thus at the transfer zone it is important to know when the fruit moves from the first conveyor to the second conveyor. It is also important that transfer does not damage the fruit. Thus, the conveyors run at the same speed to assure that in effect the transfer takes place with no relative motion between the conveyors ensuring a very soft and damage free transfer.

The system has been designed to utilise simple plastics mouldings that effectively carry out the desired functions. The complication of componentary of both conveyors has been kept to a minimum to reduce the likelihood of mass destruction at a breakdown or jam of the conveyor whilst at the same time provide efficient operation and adequate lighting.

We claim:

1. A conveying system for foodstuff comprising a first conveyor and a second conveyor placed side by side with the end of the first conveyor overlapping the start of the second conveyor, the overlapping portions of the conveyors being in close proximity to define a transfer zone, each conveyor having a plurality of support means adapted each to support a single piece of foodstuff, the support means of the first conveyor comprising an axially rotatable roller assembly pivotally secured to a support structure so that the roller assembly can tilt relative to the support structure, means to tilt the roller assembly to cause the foodstuff to move from the roller assembly of the first conveyor onto the support means of the second conveyor, the first conveyor incorporating a photographic zone and means to cause the roller assembly to rotate the foodstuff as it passes through the photographic zone, and the support means of the second conveyor being adapted to eject the foodstuff from the support means at pre-positioned ejection zones.

2. The conveying system according to claim 1 wherein the first and second conveyors are adapted to run at the same speeds.

3. The conveying system according to claim 1 wherein the conveyors are chain conveyors.

4. The conveying system according to claim 1 comprising ramp means positioned at the transfer zone to engage each roller assembly to cause each roller assembly to tilt to effect transfer of the foodstuff from the first conveyor to the second conveyor.

5. The conveying system according to claim 1 wherein each support means of the second conveyor is adapted to tilt towards the first conveyor at the transfer zone.

6. The conveying system according to claim 1 wherein the means to rotate the foodstuff as it passes through the photographic zone comprises a friction surface that is engaged by rollers of the roller assembly.

7. The conveying system according to claim 1 wherein the second conveyor includes a weighing station at which each support means and its loads are weighed.

8. The conveying system according to claim 7 wherein the weighing station includes a ramp connected to a weight sensor plate whereby as the support means passes through the weighing zone the support means is lifted by the ramp to slide on the weight sensor plate.

9. The conveying system according to claim wherein each support means of the second conveyor comprises a support member operatively attached to the chain of the conveyor, the support member pivotally supporting a pair of parallel spaced apart radius arms which in turn pivotally support a cup adapted to support a single piece of foodstuff, the radius arms being joined by a latch assembly that engages the support member to control the pivotal relationship between the radius arms and the support member.

10. The conveying system according to claim 9 wherein an externally operable trigger is provided to release the latch assembly to cause the cup and radius arms to pivot downwardly relative to the support member to cause the cup to release its contents.

11. The conveying system according to claim 9 wherein the pivot axes of the cup and radius arms and radius arms and support member are parallel to the direction of travel of the conveyor.

12. The conveying system according to claim 11 wherein the pivot axis of the cup is adjacent the free ends of the radius arms and the pivot axis of the support member is at the other ends of the radius arms so that a vertical plane containing the centre of gravity of the cup and radius arms is displaced from the pivot axis at the support member.

13. The conveying system according to claim 12 wherein the pivot axis of the cup to the radius arms is displaced from the vertical plane containing the centre of gravity of the cup so that the cup freely rests on a crossmember interconnecting the other ends of the radius arms.

14. The conveying system according to claim 9 when dependent on claim wherein the weighing station includes a ramp connected to a weight sensor plate and wherein the cup has at least one downwardly projecting leg which in use, as the cup moves through the weighing station, rides up the ramp to cause the cup to be lifted relative to the support member and to be borne by the weight sensor plate as the leg slides along the length of the sensor plate so that the plate can sense the weight of the cup and its contents.

15. The conveying system according to claim 14 wherein the cup has a pair of laterally spaced apart downwardly projecting legs that are positioned centrally of the cup in an aligned configuration across the cup.

16. The conveying system according to claim 8 wherein the length of the sensor plate is equal to the spacing of the foodstuff support means.

17. A method of sorting or classifying foodstuff comprising transporting the foodstuff along a first conveyor on support means, rotating the foodstuff through a photographic zone, monitoring characteristics of the foodstuff at the photographic zone, tilting the support means to transfer laterally the foodstuff onto a support means on a second conveyor positioned with one end overlapping and adjacent to the end of the first conveyor, carrying the support means over a load cell to weigh the foodstuff and ejecting the foodstuff from the support means of the second conveyor in accordance with the characteristics or weight of the foodstuff.

18. A support and discharge mechanism for use with a conveyor that sorts, sizes and/or weighs foodstuffs, the mechanism comprising a support member adapted to be secured onto a link of a chain of a conveyor, the support member pivotally supporting support means adjacent one edge of the support means, the support means including a pair of spaced radius arms pivotally supporting a cup, the cup being adapted to support a single foodstuff to be transported by the conveyor, the support means having a latching assembly that resiliently engages onto the support member, the latching assembly having a projecting latch whereby an upward force on the latch causes the latching assembly to disengage from the support member causing the support means and cup to pivot downwardly relative to the support member to discharge foodstuff supported by the cup.

19. The support and discharge mechanism according to claim 18 wherein the pivotal support of the cup on the radius arms allows the cup to be lifted relative to the support means to facilitate weighing of the cup and its contents.

20. The support and discharge mechanism according to claim 18 wherein the latch assembly comprises a downwardly extending flange that engages the support member to act as a stop against pivotal movement of the support means in one direction, and the latch being resiliently urged to engage the support member to act as a stop against pivotal movement of the support member in the other direction.

21. The support and discharge mechanism according to claim 18 wherein the pivotal support of the cup on the radius arms ensures a small amount of pivotal movement on either side of the pivotal axis.

* * * * *